March 13, 1962 M. F. STRATMAN 3,024,684
METHOD AND APPARATUS FOR REPRODUCING CONTOURS
Filed May 11, 1959 4 Sheets-Sheet 1

INVENTOR
MILLARD F. STRATMAN

ATTORNEYS

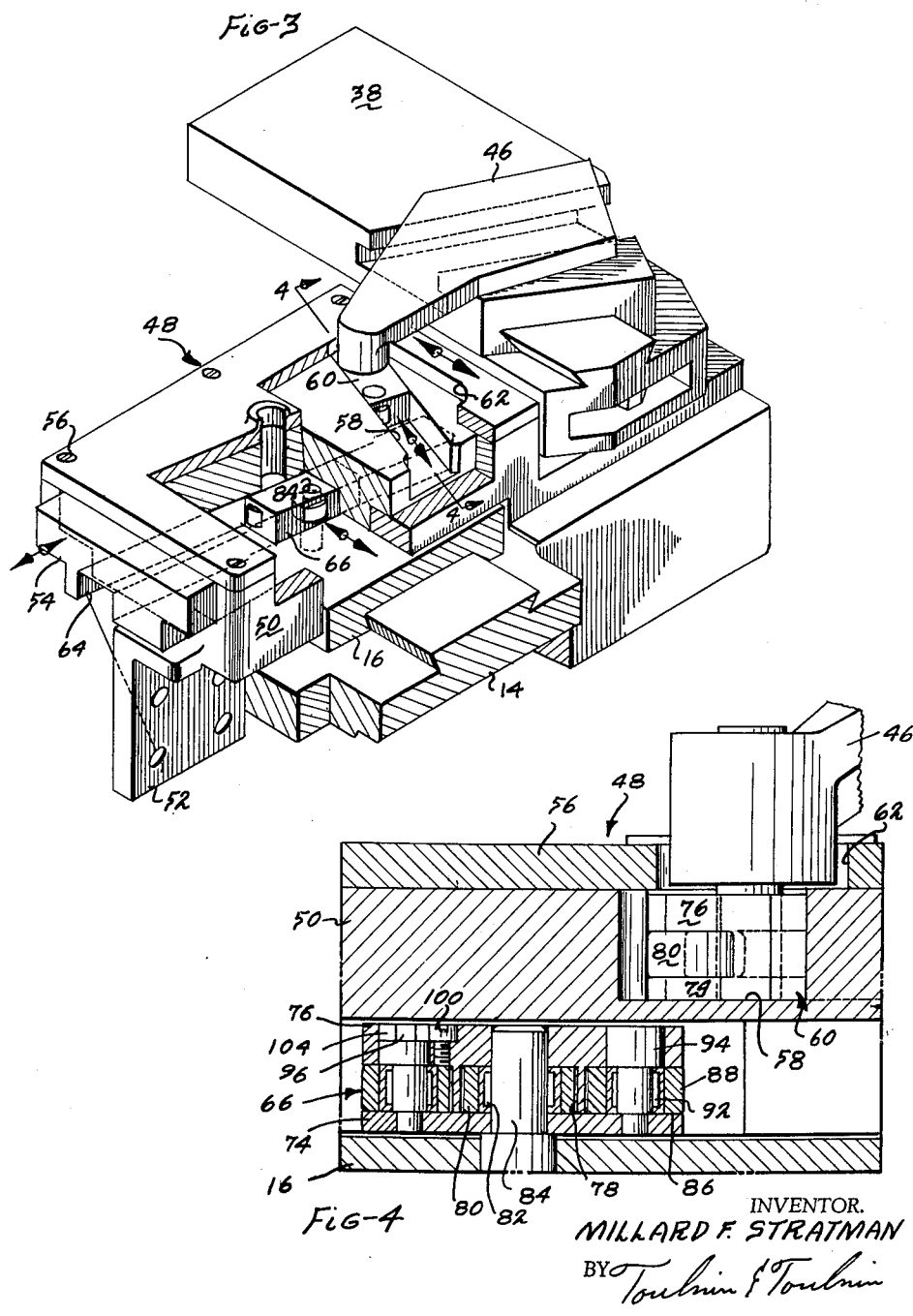

March 13, 1962 M. F. STRATMAN 3,024,684
METHOD AND APPARATUS FOR REPRODUCING CONTOURS
Filed May 11, 1959 4 Sheets-Sheet 4
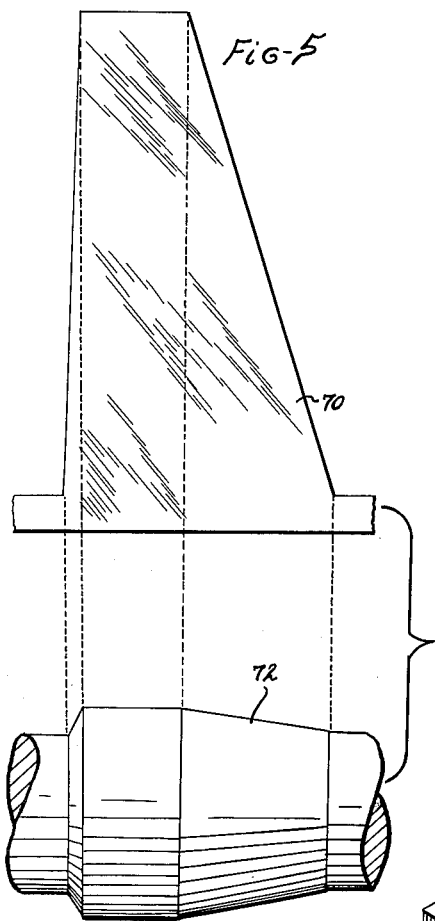
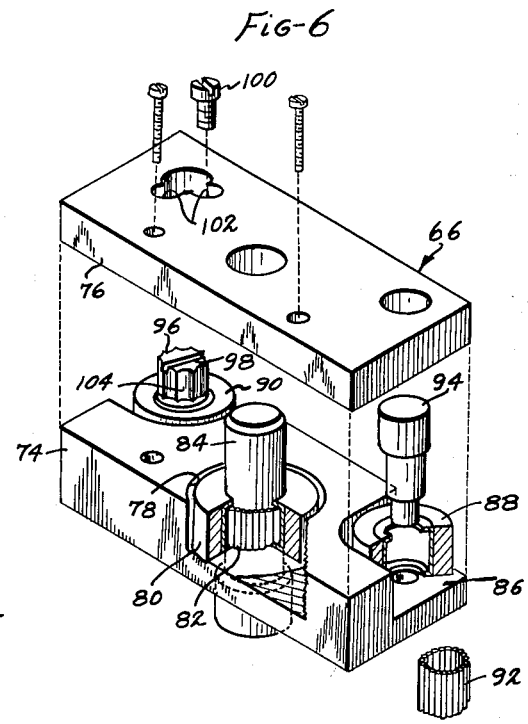
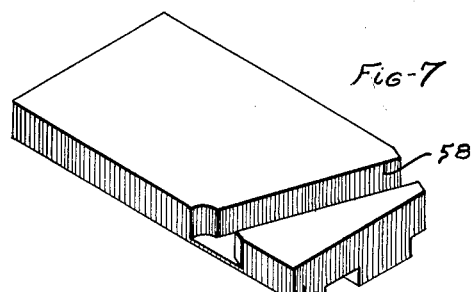
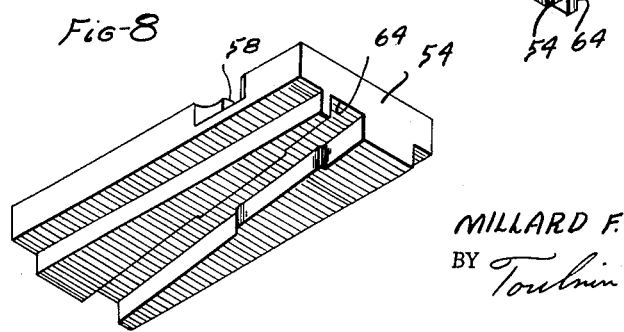
INVENTOR.
MILLARD F. STRATMAN
BY
ATTORNEYS United States Patent Office 3,024,684
Patented Mar. 13, 1962

3,024,684
METHOD AND APPARATUS FOR REPRODUCING CONTOURS

Millard F. Stratman, Cincinnati, Ohio, assignor to The R. K. Le Blond Machine Tool Company, Cincinnati, Ohio, a corporation of Delaware Filed May 11, 1959, Ser. No. 812,428
7 Claims. (Cl. 82—14)

This invention relates to contour reproducing devices and is particularly concerned with such a device for a lathe or similar turning machine.

Contour reproducing devices for lathes are known and usually comprise an arrangement for mounting a template on a lathe bed and using the template to control a servo-motor operated tool slide.

In general, such devices are quite satisfactory for reproducing the contour of the template on the workpiece being turned. The servo-motor controlled tool slide in such a case makes a relatively accurate one to one reproduction of the template contour on the workpiece and accordingly it will be evident that the workpiece can be turned to no closer limits than the accuracy within which the template can be made in combination with the accuracy of the servo-motor controlled tool slide.

In certain instances, particularly where there are only small variations in the diameters being turned, or where there is a small taper to be formed, the accuracy of the turned workpiece is not always easily kept within the desired limits.

Having the foregoing in mind, a primary object of the present invention is to provide a template controlled contour reproducing mechanism which will be more accurate than those of the prior art.

A still further object of this invention is the provision of a template controlled contour reproducing mechanism in which the template can readily be formed so that an extremely high degree of accuracy of the turned work member is had.

A still further object of this invention is the provision of a template controlled contour reproducing mechanism in which the connection between the template follower of the servo-motor and the tool slide includes a motion reducing coupling so that the motion of one of the follower and tool slide is a multiple of the other.

A particular object of this invention is the provision of an arrangement for reproducing template contours at greatly reduced size on workpieces whereby the forming of the template to accurate limits can easily be accomplished.

It is also an object of this invention to provide a contour reproducing mechanism of the nature referred to which can readily be mounted on a substantially conventional lathe structure.

These and other objects and advantages will become more apparent upon reference to the drawings in which:

FIGURE 3 is a perspective view of the multiplier mechanism that connects the servo-motor with the tool slide;

FIGURE 4 is a vertical sectional view indicated by line 4—4 on FIGURE 3;

FIGURE 5 is a diagrammatic view showing the relationship between a template and the workpiece contour reproduced thereby by the mechanism of this invention;

FIGURE 6 is an exploded perspective view showing one of the slide shoes of the multiplying mechanism;

FIGURE 7 is a perspective view looking down toward the top of a slotted block forming a part of the multiplier mechanism; and FIGURE 8 is a view like FIGURE 7 but is taken looking up from beneath the slotted block.

Figure 1:
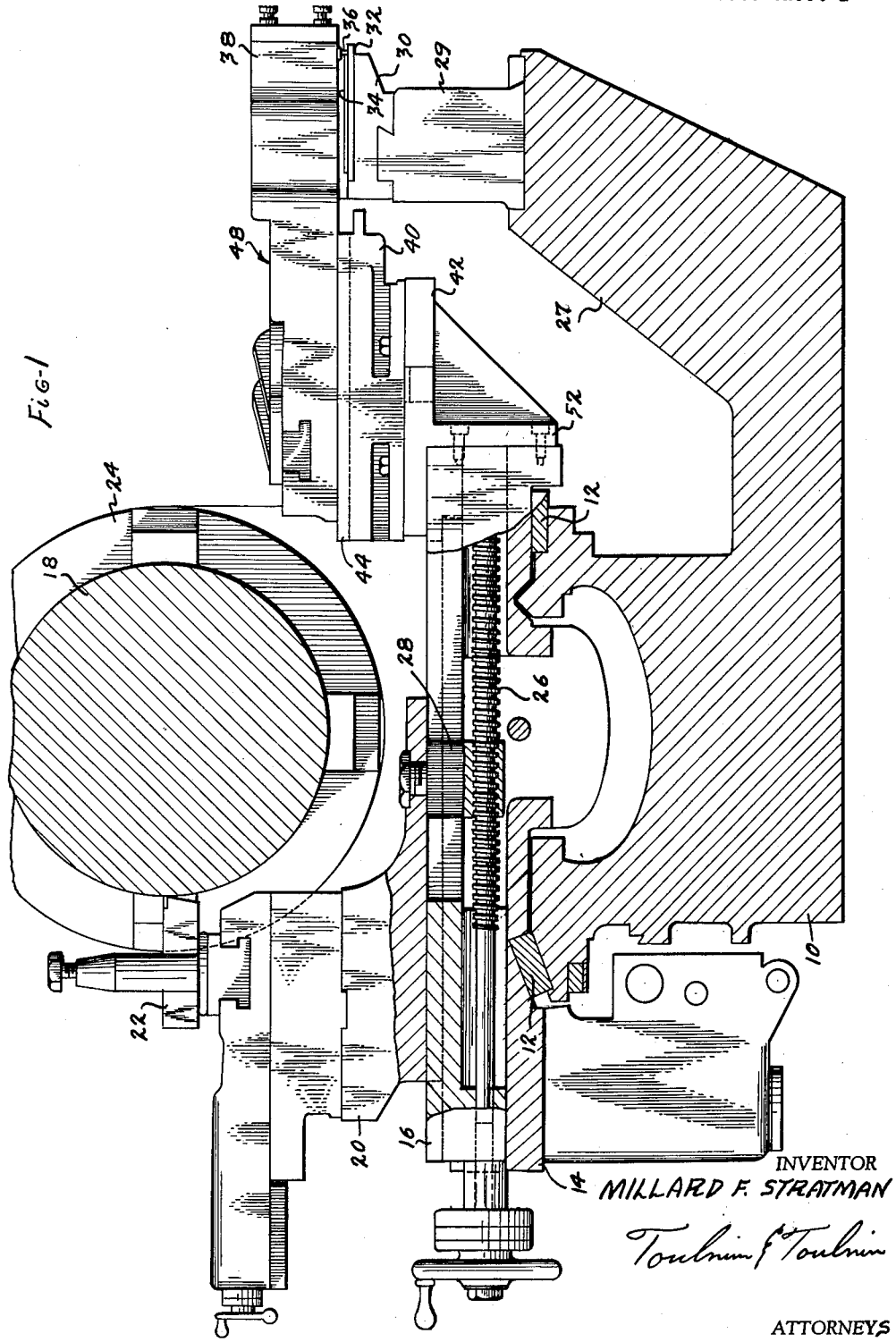
FIGURE 1 is a transverse sectional view more or less diagrammatic showing a template controlled turning device according to the present invention mounted on a lathe carriage.
Figure 2:
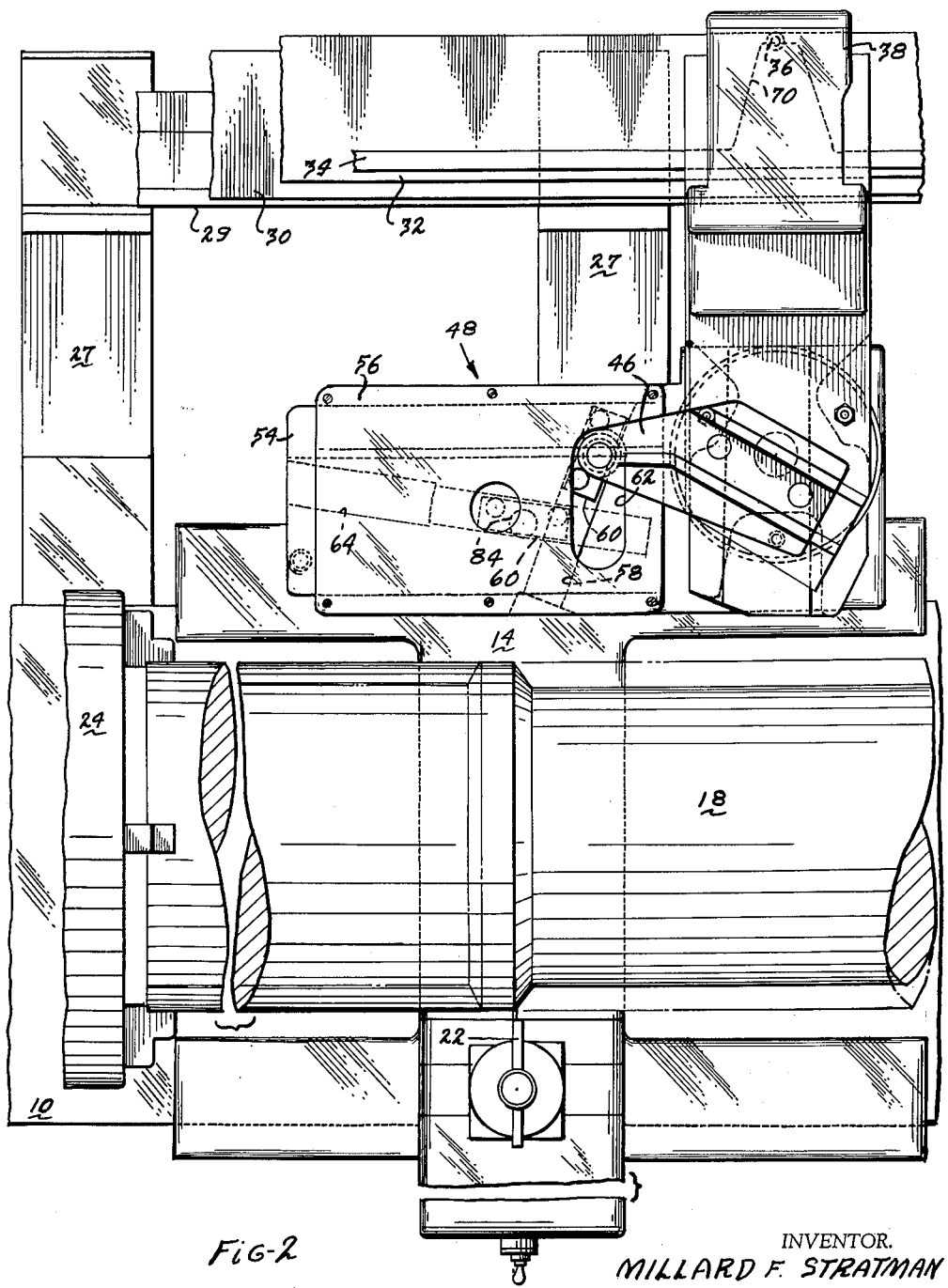
FIGURE 2 is a plan view looking down on top of the structure of FIGURE 1.

Referring to the drawings somewhat more in detail and with particular reference to FIGURES 1 and 2, there is somewhat diagrammatically illustrated therein a lathe having a bed 10 on the ways 12 of which there is slidably mounted a carriage 14.

Carriage 14 has a bottom slide 16 thereon which is movable toward and away from the axis of rotation of workpiece 18 by the template controlled servo-motor and multiplier mechanism to be described subsequently.

Mounted on bottom slide 16 is a tool slide 20 which carries a turning tool 22 for turning workpiece 18. Workpiece 18 is supported in any sort of suitable spindle and drive mechanism 24.

Tool slide 20 is adjustable on bottom slide 16 as by the screw 26 carried in the bottom slide 16 and nut 28 that engages the screw 26 and which is attached to the tool slide 20.

The bed 10 of the lathe has an extension or bracket 27 attached thereto on which is mounted a base member 29 that forms a support for a template.

Mounted on the base 29 for adjustment longitudinally thereof is a slide 30 and carried on slide 30 is a base plate 32 that supports the template bar 34.

The template bar 34 is engaged by a follower element 36 of a servo-motor mechanism 38 which may be of substantially any conventional type, for example, a hydraulic servo-motor mechanism such as illustrated in the Waterson Patent 2,576,817.

The servo-motor mechanism 38 is movable on a swivel base 40 under the influence of follower 36 and swivel base 40 is attached by bracket means 42 with carriage 14 so as to move therewith. The connection between the servo-motor 38 and swivel base 40 includes a dove tail guideway 44 and the arrangement provides that as the carriage 14 moves along ways 12 of the bed 10 follower 36 remains in engagement with the template 34 and the slide 39 of the servo motor mechanism 38 moves inwardly and outwardly in guideway 44 of swivel base 40 to maintain the fixed relationship between the follower 36 and the template 34.

According to the present invention the servo-motor mechanism 38, instead of being directly connected with the tool slide 20 as is usually the case, it is connected by way of an arm 46 with an infeed-outfeed reduction coupling 48, which, in turn is connected with the tool slide 20.

Coupling 48 consists of a body part 50 attached by bracket means 52 to the carriage 14 so as to move therewith. Within the body part 50 there is mounted a slide block or cam plate 54 which is slidable in the body part 50 in a direction parallel with the work axis. The slide block or cam plate 54 is located in a machined recess in the said body part 50 and is retained in place by a cover members 56 bolted to the body part 50. Suitably adjustable gib means may be provided for providing that the slide block or cam plate 54 will be extremely accurately guided within the body part 50.

According to this invention the slide block or cam plate 54 is provided in its upper surface with a slot or groove 58 extending at an angle to the direction of movement of the servo-motor slide 39. Within this slot or groove 58 is a shoe 60 connected with arm 46 of the servo motor slide 39. It will be evident that movement of the servo-motor slide 39 will be accompanied by movement of slide block or cam plate 54 in the body part 50 and in an amount that can be predetermined by the angle of slot or groove 58 relative to the direction of movement of the servo-motor slide 39.

Access to the shoe 60 is had by arm 46 through a slot 62 formed in the cover plate 56.

The slide block or cam plate 54 also has a slot or groove 64 in its underneath side and this is inclined at an angle to the direction of movement of the tool slide 20.

A second shoe 66 in slot or groove 64 is connected with the lower slide 16 so that as slide block or cam plate 54 moves within the supporting body part 50, the slide 16 will be caused to move in its guideways and to carry with it the tool slide 20.

It will be evident that the coupling 48 can be so constructed by selecting the angles for the slots or grooves therein that substantially any multiplying factor can be introduced into the connection between the cutting tool 22 and the template follower 36. In the arrangement illustrated the multiplying factor is about twenty times which is to say that the template follower 36 will take a movement toward and away from the work axis of the machine that is twenty times the amount of moment of the cutting tool 22 toward and away from the work axis of the machine.

This permits the templates to be constructed on such a scale that slight differences in diameter of the workpiece or gradual tapers can readily be provided for in the template contour. Ordinary machining methods can be employed to make the template and it can be held within ordinary limits of accuracy and a highly accurate workpiece will result because of the use of the coupling 48 according to this invention.

FIGURE 5 illustrates, simply by way of example, the relationship between a template 70 and a workpiece 72 turned thereby. It will be noted that all dimensions lengthwise of the template 70 are the same as those of the workpiece 72 whereas differences in dimension of the template 70 radially of the workpiece 72 are twenty times as large as the corresponding differences in dimension of the workpiece 72.

The aforementioned shoes 60 and 66 are preferably constructed as illustrated in FIGURE 6 wherein it will be seen that each shoe comprises a block 74 and a plate 76. Block 74 has a recess 78 in which is mounted a roller 80 supported on needle bearing 82 on a post or shaft 84. Post or shaft 84, in the case of lower shoe 66 forms the means for connecting the shoe with the lower slide 16 and in the case of the upper shoe 60 the post provides the means of effecting connection of the shoe with arm 46 of the servo-motor mechanism 38.

On the opposite side of the block 74 from roller 80 and at the ends of the block 74 there are provided recesses 86 within which are mounted rollers 88 and 90 also supported on needle bearings as at 92. One roller is supported on a stud 94 and the other is supported on an eccentric stud 96 that can be rotated by means of screw slot 98 and is adapted for being locked in position by lock screw 100 that threads into plate 76 in one of two spaced holes 102 so that the head of the lock screw will engage one of the flutes 104 in the head of eccentric pin 96.

By this arrangement the block 74 can be placed in its slot or groove 58 or 64, and the rollers 90 adjusted by turning eccentric stud 96 so that the shoe engages both sides of its guide slot or groove 58 or 64 without any lost motion whatsoever.

It will be understood that this invention is susceptible to modification in order to adapt it to different usages and conditions; and, accordingly, it is desired to comprehend such modifications within this invention as may fall within the scope of the appended claims.

I claim:

1. In a template controlled contouring machine; a bed, a first support movable in the bed, a tool slide movably mounted on the first support adapted for carrying a cutting tool, a servo-motor mechanism mounted on the first support and including a servo-motor slide movable in the same direction as said tool slide, said servo-motor mechanism including a template follower, a template support on the bed, means for moving said first support to cause said servo-motor mechanism to traverse a template carried by said template support simultaneously with the traversal of a workpiece in the machine by said tool slide, and means connecting said servo-motor slide with said tool slide comprising a cam block guided on the first support for movement in a direction at an angle to the direction of movement of said slides, first and second cam slots in said cam block extending at respectively different angles to the direction of movement of said slides, and means on each said slide engaging a respective one of said slots for actuation of said tool slide in response to movement of said servo-motor slide.

2. In a template controlled contouring machine; a bed, a first support movable in the bed, a tool slide movably mounted on the first support adapted for carrying a cutting tool, a servo-motor mechanism mounted on the first support and including a servo-motor slide movable in the same direction as said tool slide, said servo-motor mechanism including a template follower, a template support on the bed, means for moving said first support to cause said servo-motor mechanism to traverse a template carried by said template support simultaneously with the traversal of a workpiece in the machine by said tool slide, and means connecting said servo-motor slide with said tool slide comprising a cam block guided on the first support for movement in a direction at an angle to the direction of movement of said slides, first and second cam slots in said cam block extending at respectively different angles to the direction of movement of said slides, and means on each said slide engaging a respective one of said slots for actuation of said tool slide in response to movement of said servo-motor slide, said first and second cam slots being in respectively opposite sides of said cam block.

3. In a lathe; a bed, means defining a work axis on the bed on which a workpiece is to be mounted and rotated, a carriage on the bed movable parallel to the work axis, a tool slide on the carriage movable toward and away from said work axis, a servo-motor mechanism on the carriage including a template follower, said servo-motor mechanism including a part slidably mounted on the carriage to slide thereon in a direction perpendicular to the lateral direction of carriage movement, means on the bed for supporting a template to be followed by said follower, a cam block slidable on said carriage, a first cam slot in said cam block and means on the said part of said servo-motor mechanism engaging the first cam slot so that movement of the said part of said servo-motor under the influence of the template will cause movement of the cam block, a second cam slot in said cam block, and means on the tool slide engaging said second cam slot whereby movement of the cam block will cause movement of the tool slide, said means engaging the cam slots comprising spaced rollers engaging opposite sides of the cam slots, said cam slots extending at an angle to each other and to the direction of movement of said tool slide and said part of said servo-motor mechanism.

4. In a lathe, a bed, means defining a work axis extending longitudinally along the bed, a carriage movable along the bed parallel with the work axis, a lower slide on the carriage movable toward and away from the work axis, a tool supporting slide on the lower slide adjustably connected therewith, a servo-motor mechanism carried by the carriage including a template follower, said servo-motor mechanism including a part slidably mounted on the carriage to slide thereon in a direction perpendicular to the lateral direction of carriage movement, means on the bed supporting a template to be followed by said follower, a member mounted on the carriage defining a guideway extending at an angle to the direction of movement of said part of said servo-motor mechanism, a cam block guided in the guideway in said member, cam slots in said cam block inclined at an angle to each other and also inclined at an angle to said work axis and to a perpendicular to the work axis, shoes closely fitted into said cam slots, one of said shoes being connected with the said part of said servo-mechanism to be actuated thereby as the follower follows the template, and the other of the said shoes being connected with said lower slide to move the lower slide and the tool carrying slide as the cam block is moved by the servo-motor mechanism.

5. In a lathe, a bed, means defining a work axis extending longitudinally along the bed, a carriage movable along the bed parallel with the work axis, a lower slide on the carriage movable toward and away from the work axis, a tool supporting slide on the lower slide adjustably connected therewith, a servo-motor mechanism carried by the carriage including a template follower, said servo-motor mechanism including a part slidably mounted on the carriage to slide thereon in a direction perpendicular to the lateral direction of carriage movement, means on the bed supporting a template to be followed by said follower, a member mounted on the carriage defining a guideway extending at an angle to the direction of movement of said part of said servo-motor mechanism, a cam block movably guided in the guideway in said member, cam slots in said cam block inclined at an angle to each other and also inclined at an angle to said work axis and to a perpendicular to the work axis, shoes closely fitted into said cam slots, one of said shoes being connected with the said part of said servo-mechanism to be actuated thereby as the follower follows the template, the other of the said shoes being connected with said lower slide to move the lower slide and the tool carrying slide as the cam block is moved by the servo-motor mechanism, each of said shoes comprising a block disposed in the cam slot pertaining thereto, and rollers distributed in each block and engaging opposite sides of the respective cam slot.

6. In a lathe, a bed, means defining a work axis extending longitudinally along the bed, a carriage movable along the bed parallel with the work axis, a lower slide on the carriage movable toward and away from the work axis, a tool supporting slide on the lower slide adjustably connected therewith, a servo-motor mechanism carried by the carriage including a template follower, said servo-motor mechanism including a part slidably mounted on the carriage to slide thereon in a direction perpendicular to the lateral direction of carriage movement, means on the bed supporting a template to be followed by said follower, a member mounted on the carriage defining a guideway, a cam block guided in the guideway in said member, cam slots inclined at an angle to each other in said cam block and both slots being inclined at an angle to said work axis and to a perpendicular to the work axis, shoes closely fitted into said cam slots, and one of said shoes being connected with the said part of said servo-motor mechanism to be actuated thereby as the follower follows the template, the other of the said shoes being connected with said lower slide to move the lower slide and the tool carrying slide as the cam block is moved by movement of the said part of said servo-motor mechanism, each of said shoes comprising a block disposed in the cam slot pertaining thereto, and rollers distributed in the block and engaging opposite sides of the cam slot, one of said rollers being radially adjustable in its pertaining block to eliminate lost motion of the shoes in the cam slot and to take up for wear.

7. In a lathe; a bed having a work axis extending longitudinally therealong, a carriage slidably mounted on the bed for movement parallel with the work axis, a lower slide on the carriage movable at right angles to the said work axis, a tool slide adjustably mounted on the lower slide, a servo-motor mechanism mounted on the carriage including a template follower, said servo-motor mechanism including a part slidably mounted on the carriage to slide thereon in a direction perpendicular to the lateral direction of carriage movement, means mounting a template on the bed to be followed by the follower as the carriage moves, a member attached to the carriage having a guideway parallel with the work axis, a cam block retained in the guideway for movement therein, a first cam slot in said cam block extending at an acute angle to a perpendicular to the work axis, a second cam slot in the opposite side of the block extending at an acute angle to the work axis, a shoe in each said cam slot, a connection from the shoe in the first mentioned slot to the said part of the servo-mechanism, and a connection from the other shoe to the said lower slide.

References Cited in the file of this patent
UNITED STATES PATENTS

| | | |
|---|---|---|
| 1,562,173 | Huguet | Nov. 17, 1925 |
| 2,184,377 | Bickel | Dec. 26, 1939 |
| 2,184,684 | Bickel | Dec. 26, 1939 |
| 2,392,606 | Maddox | Jan. 8, 1946 |
| 2,484,874 | Brown | Oct. 18, 1949 |
| 2,732,770 | Hoglund | Jan. 31, 1956 |
| 2,790,325 | Bedker | Apr. 30, 1957 |